United States Patent [19]

Harry et al.

[11] Patent Number: 4,676,155

[45] Date of Patent: Jun. 30, 1987

[54] DRIVE UNIT

[75] Inventors: Alan J. Harry; John Poley, both of Royston; Douglas S. MacArthur, Haslingfield, all of England

[73] Assignee: PA Consulting Services Limited, London, England

[21] Appl. No.: 676,812

[22] Filed: Nov. 30, 1984

[30] Foreign Application Priority Data

Dec. 2, 1983 [GB] United Kingdom ................. 8332244

[51] Int. Cl.[4] ......................... B41J 1/60; F16D 41/04

[52] U.S. Cl. ....................................... 101/110; 74/816; 74/665 F; 192/48.92; 101/91

[58] Field of Search ...................... 74/816, 126, 665 F; 192/48.6, 48.3, 48.92, 46; 101/91, 110

[56] References Cited

U.S. PATENT DOCUMENTS

| | | | |
|---|---|---|---|
| 2,242,272 | 5/1941 | Swan | 192/48.6 |
| 2,905,294 | 9/1959 | Kellogg | 192/46 |
| 3,948,172 | 4/1976 | Jenkins | 192/48.92 X |
| 4,140,055 | 2/1979 | Lallemand | 101/91 |
| 4,164,191 | 8/1979 | Peterson | 192/48.92 X |
| 4,246,643 | 1/1981 | Hubbard | 101/91 X |
| 4,271,758 | 6/1981 | Ostevhof | 101/91 X |

FOREIGN PATENT DOCUMENTS

| | | |
|---|---|---|
| 166670 | 12/1903 | Fed. Rep. of Germany . |
| 1031601 | 6/1958 | Fed. Rep. of Germany . |
| 1199431 | 12/1959 | France . |
| 139154 | 12/1979 | German Democratic Rep. . |
| 379124 | 8/1932 | United Kingdom . |
| 720260 | 12/1954 | United Kingdom . |
| 727955 | 4/1955 | United Kingdom . |
| 877161 | 9/1961 | United Kingdom . |
| 985127 | 8/1965 | United Kingdom . |
| 1037206 | 7/1966 | United Kingdom . |

OTHER PUBLICATIONS

Copies of European and United Kingdom Search Reports.

*Primary Examiner*—Alan Cohan
*Assistant Examiner*—John A. Rivell
*Attorney, Agent, or Firm*—Oblon, Fisher, Spivak, McClelland & Maier

[57] ABSTRACT

Independent control by a single motor of two members mounted on a shaft, e.g. print wheels in a printing machine such as a postal franking machine, is enabled by having the first member either fixed in rotation to the shaft or connected to the shaft by a one-way clutch, and having the second member connected to the shaft by a one-way clutch, the arrangement being such that rotation of the shaft in one direction causes movement of the first member only (by direct drive or by the action of the associated clutch) and rotation of the shaft in the other direction causes movement of the second member only, by the action of the associated clutch.

11 Claims, 16 Drawing Figures

DRIVE UNIT

DESCRIPTION

Field of Invention

This invention concerns drive units and particularly drives for controlling two or more sets of characters such as numbers, independently.

Background to the Invention

It is commonly necessary to provide for the independent adjustment of two sets of characters such as will appear in a display of a word or numerals. The present invention provides a simple drive unit for such applications, which only requires a single motor.

SUMMARY OF THE INVENTION

According to one aspect of the present invention, there is provided a drive mechanism by which a first member is rotated by a direct connection between it and a driving shaft and a second member, also mounted on the same shaft, but freely rotatable relative thereto, can be rotated by the shaft through a clutch which exerts a positive drive on the member when the shaft is rotating in one direction but allows the member to free wheel when the shaft rotates in the opposite direction.

The invention also lies in a drive mechanism by which first and second members mounted on a shaft for rotation about a common axis are drivable independently by a single motor driving the shaft, wherein the two members are connected to the shaft through two one-way clutches acting in opposite hands so that rotation of the shaft by the motor in one sense will cause one of the members to rotate and rotation of the shaft in the opposite sense will cause the other member to rotate.

The invention is of particular application as a value and date changing mechanism for adjusting print wheels (or loops containing print characters) in a printing machine, such as a postal franking machine.

The invention may be linked with an indexing device for providing an indication as to the exact position of loops or print wheels or the like controlled by the drive unit.

One application of the invention is in a digital display device for displaying any combination of two (or more) numbers—the number of numbers to be displayed dictating the number of separate drive units which will be required.

The invention will now be illustrated by way of example with reference to the accompanying drawings in which FIG. 1 is a perspective view of a printing head and platen mechanism embodying features of the invention;

Figure 5:
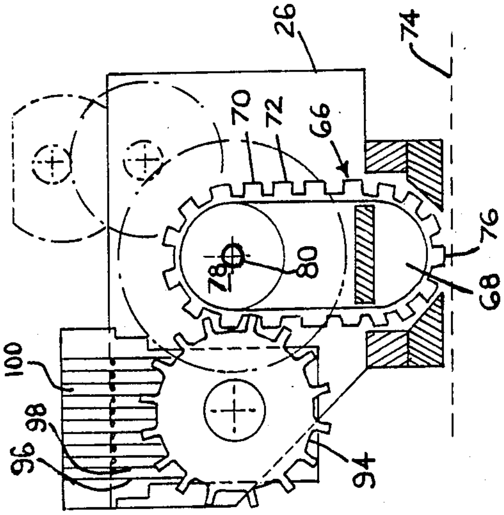
FIG. 5 is a diagrammatic side view showing part of the printing and indexing mechanism contained within the printing head of the mechanism shown in FIGS. 1 and 2.
Figure 6:
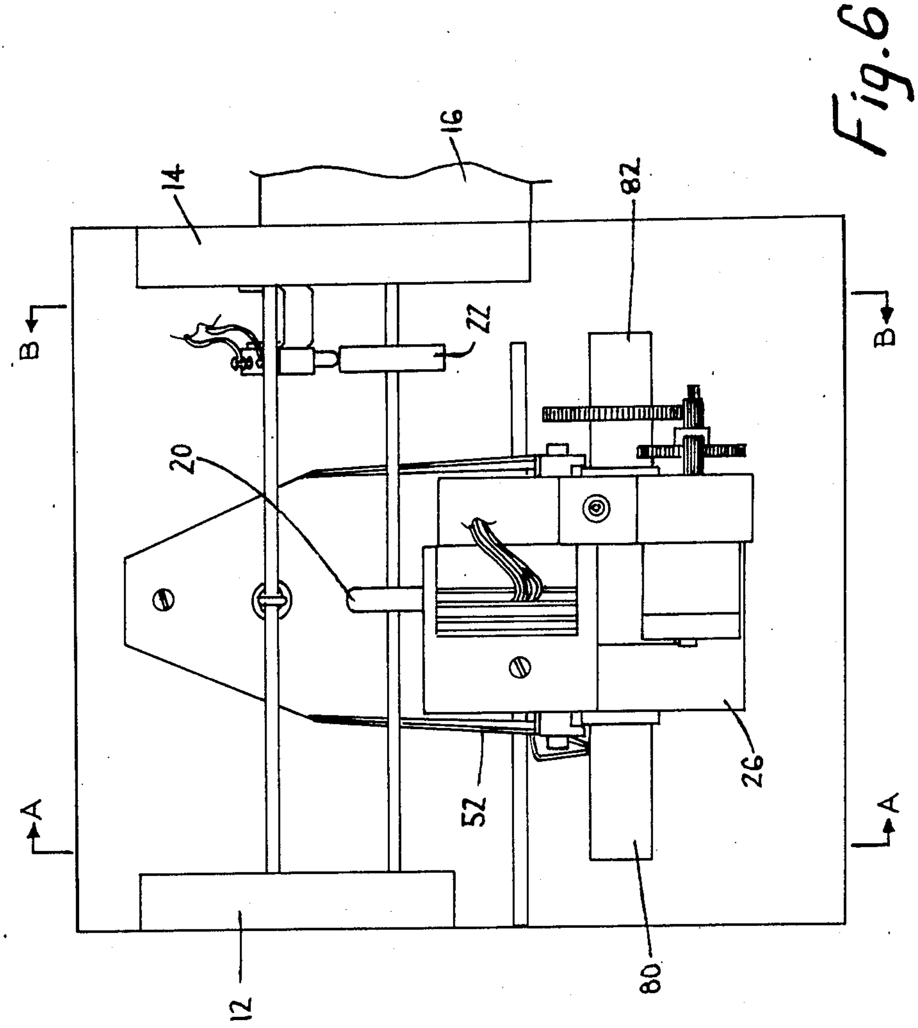
FIG. 6 is a top plan view of the mechanism shown in FIG. 1.
Figure 7:
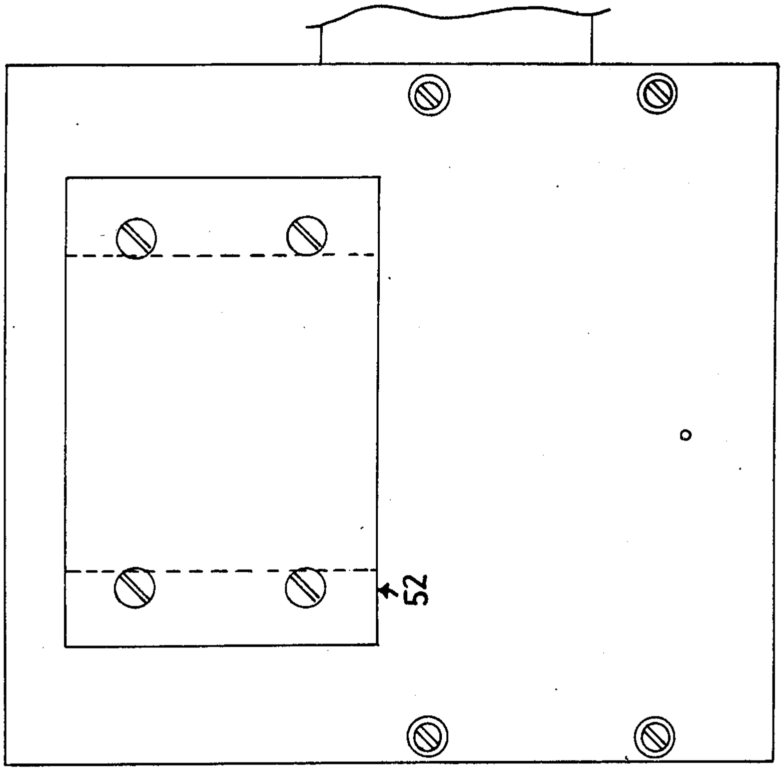
FIG. 7 is an underside view of the same mechanism.
Figure 14:
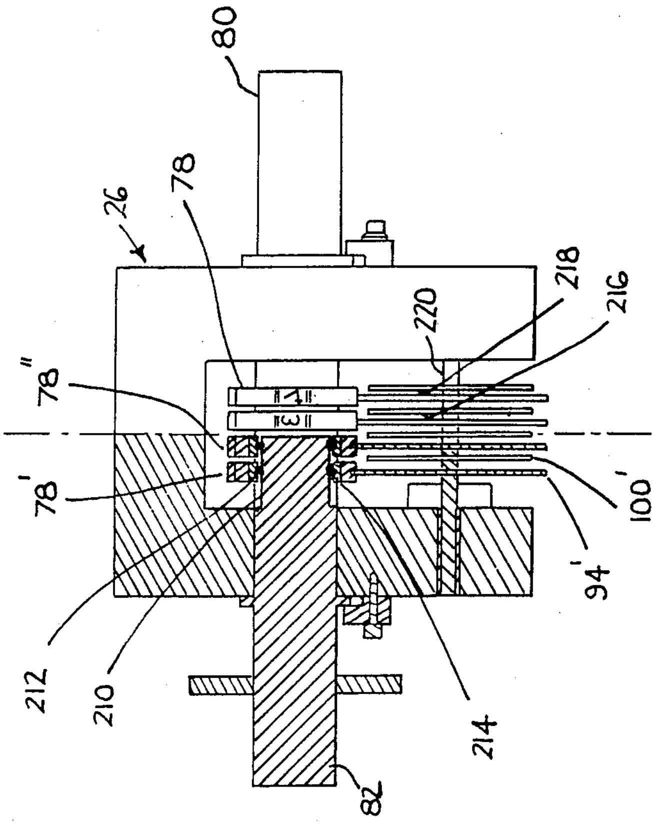
Figure 15:
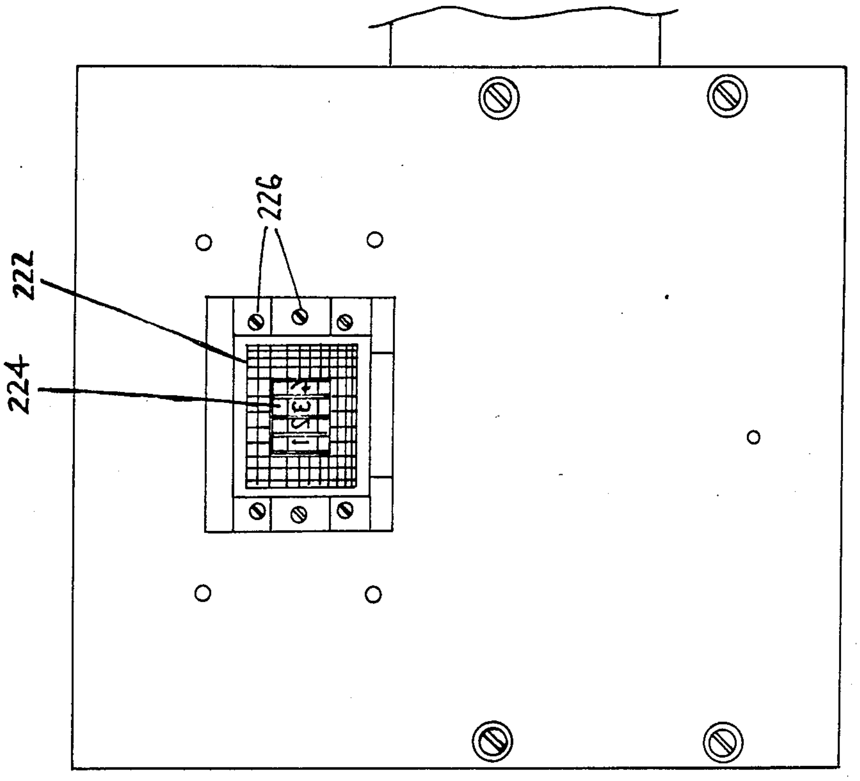
Figure 16:
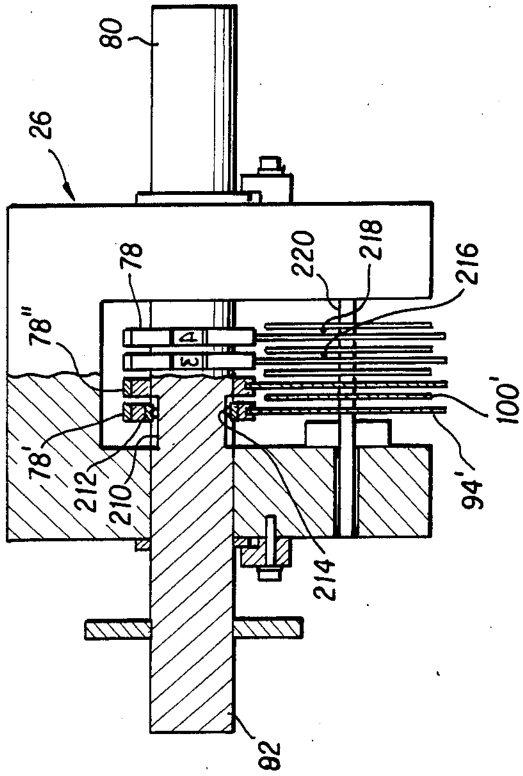

FIG. 14 is an underside view of the printing head of FIGS. 1-7 shown partly in cross-section on a plane through the axis of rotation of the shafts 80, 82; and FIG. 15 is an underside of the platen and head assembly of FIGS. 1-7 with the coverplate 52 of FIG. 7 removed; and FIG. 16 is a view similar to that of FIG. 14 but showing grooves and rolling elements forming a one-way clutch for only one driving wheel per shaft.

DETAILED DESCRIPTION OF DRAWINGS

Figure 1:
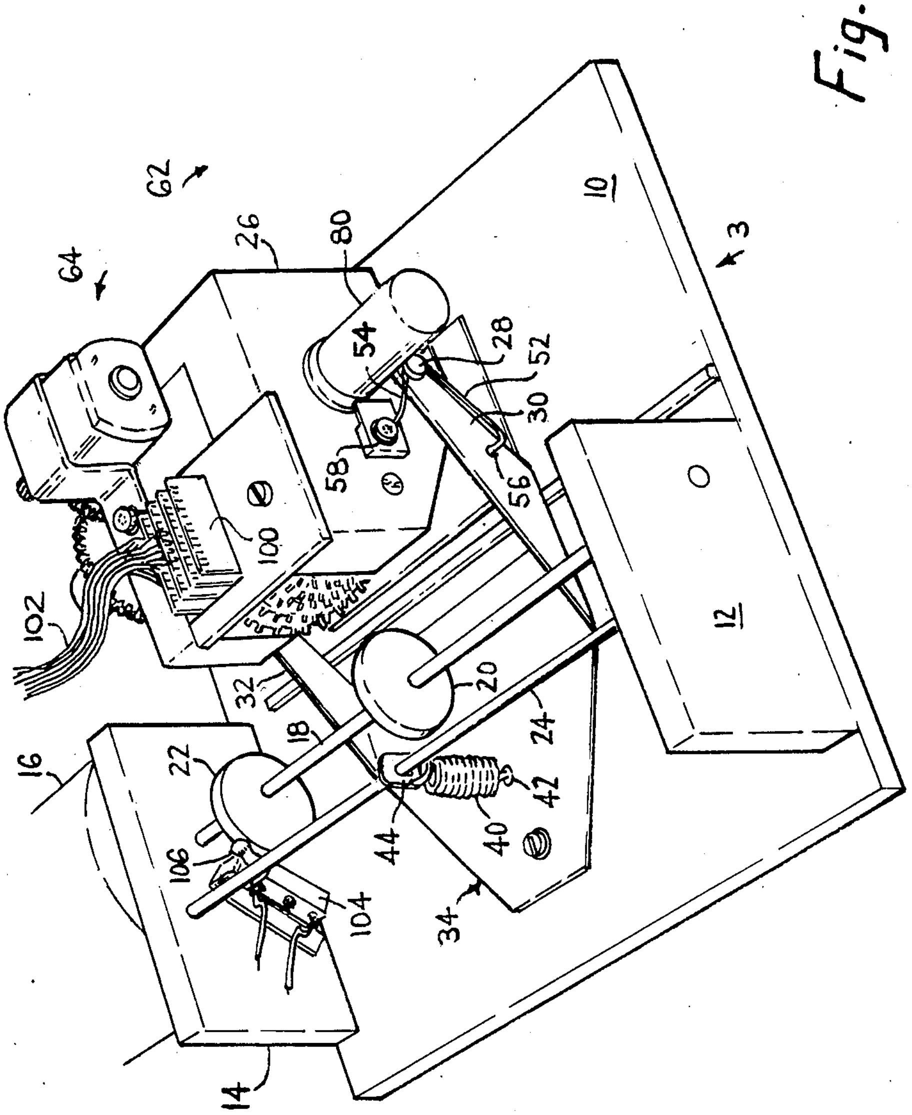
Figure 2:
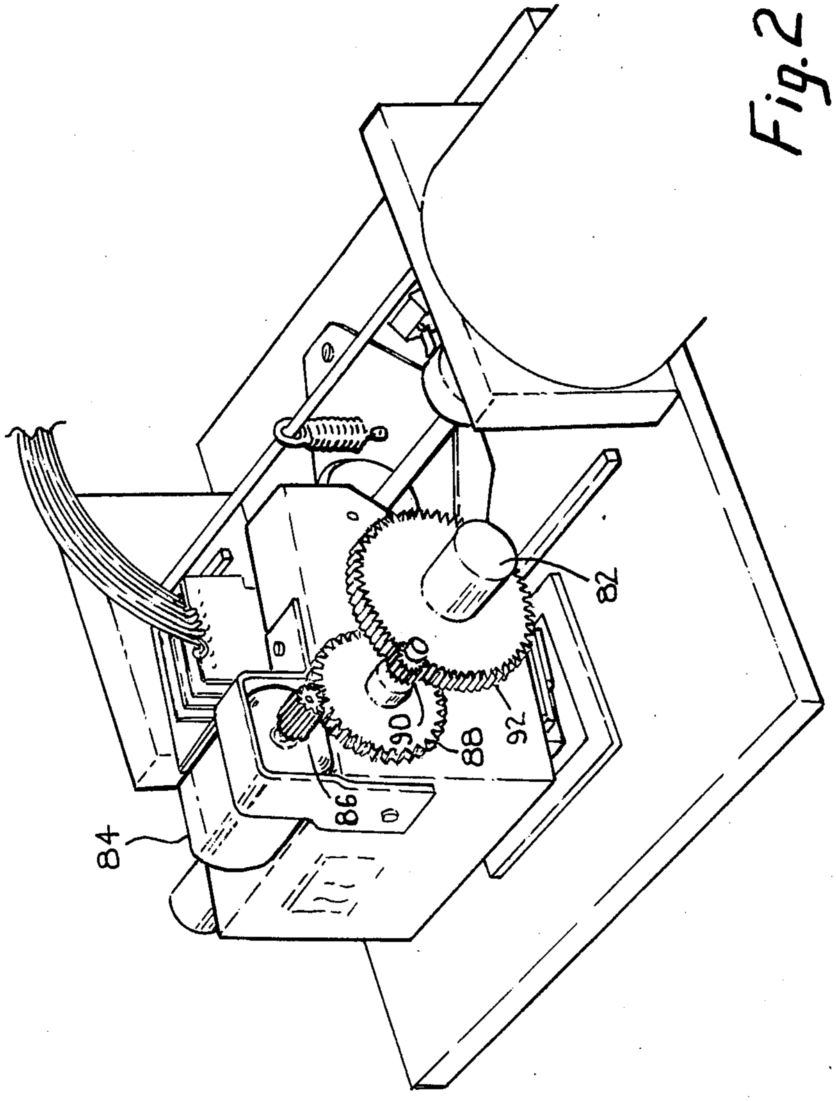
FIG. 2 is a second perspective view of the mechanism of FIG. 1 from a different angle.

In FIGS. 1 and 2 there is shown a basic printing head mechanism of the type which can be incorporated into a franking machine or the like. The mechanism shown in FIGS. 1 and 2 and the subsequent five Figures is intended to illustrate the principle of operation and construction more clearly than is the case when the components are miniaturised and compacted more densely than in the mechanism shown. A final form of the apparatus illustrating the use of the same type of printing head in a parallel multi-head arrangement in a franking machine is shown in later Figures.

In the drawings a baseplate 10 serves as a support for two sideplates 12 and 14. A drive motor and gearbox assembly (not shown in detail) 16 is attached to and extends beyond the side wall 14 and serves to rotate a drive shaft 18 carrying a main print head operating cam 20 and a supplementary switch-actuating cam 22.

Also between the two sidecheeks 12 and 14 extends a second shaft or rod 24 which is parallel to but spaced from and to the rear of the drive shaft 18.

The printing head comprises a generally rectangular housing 26 which is pivotally attached at 28 on the one side and at a similar point (not visible in the drawings) on the other side of the housing 26 by means of stub-axles, to opposite side members 30 and 32 respectively of a yoke assembly generally designated 34.

Figure 3:
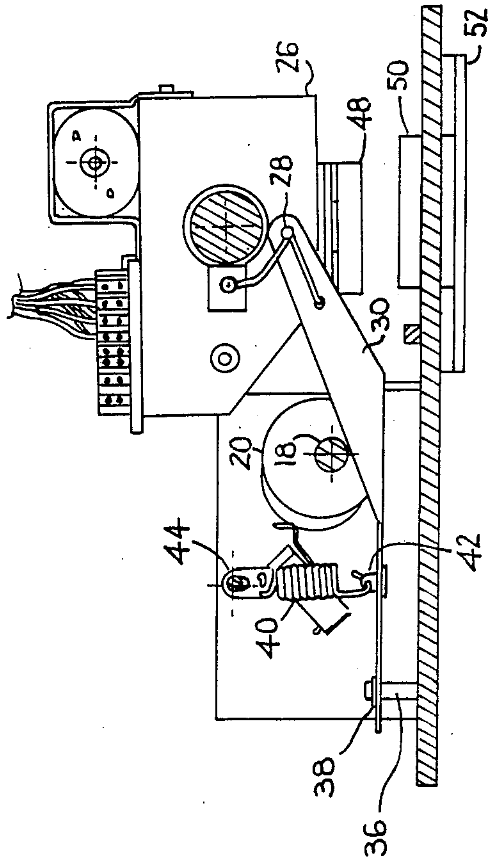
FIG. 3 is a side view of the mechanism of FIG. 1 viewed in the direction of arrow 3 and with the sideplate removed.
Figure 4:
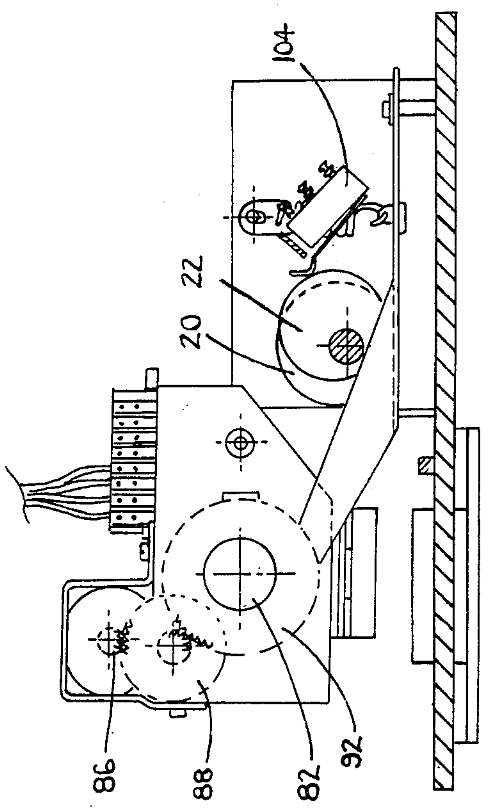
FIG. 4 is a similar side view of the mechanism shown in FIG. 1 viewed from the opposite direction to that of arrow 3 and with the sideplate removed.

The latter is relatively freely floating in that it is secured to the baseplate 10 through a lost motion connection best seen in FIGS. 3 and 4. This comprises an upstanding pin 36 having an enlarged head 38 which holds captive the generally flat plate section of the yoke assembly 34. The latter includes an aperture (not shown) which is oversize relative to the diameter of the pin 36 so that the plate of the yoke assembly 34 can, in fact, tilt to one side or the other as well as in a generally up and down manner relative to the baseplate 10.

The yoke assembly is held in place by means of a spring 40 located between a point of attachment at 42 in the middle of the plate of the yoke assembly 34 and attached to a fisher plate 44 which itself is threaded on the rod 24 extending between the two sidecheeks 12 and 14. The spring is selected so as to still be in tension when the side arms of the yoke assembly 30 and 32 engage the underside of the axle 18 which is the normal centralised position for the assembly under the action of the spring 40.

The yoke assembly and therefore the printing head 26 can be moved in a downward direction for printing by rotation of the cam 20 to deflect the yoke 34 in the direction of the arrow 46 (see FIG. 3).

The printing head includes a print face 48 containing characters which, if inked, will leave a suitable impression on an envelope or letter situated thereunder and aligned with and below the print face 48 is a platen 50 which is located in position by means of an underplate assembly 52 secured in position by means of four screws as can best be seen in FIG. 7.

Removal of the plate 52 gives uninterrupted access through an aperture (not shown) in the baseplate 10, to the print face 48 to facilitate checking, cleaning and replacing members of the print head assembly.

The orientation of the print head 26 relative to the yoke arms 30 and 32 is maintained by means of at least one spring best seen in FIG. 1. The spring includes two radial arms 52 and 54 and is looped at its centre around the protruding end of the stub-shaft 28 the outboard end of which is enlarged to prevent the spring loop from leaving the stub-shaft.

The outboard ends of the radial arms 52 and 54 are secured on the one hand in an aperture 56 in the arm 30 and around a fixed stand-off 58 attached to the side of the pring head housing 26.

A similar spring (not shown) is provided on the other side of the housing 26 between it and the other arm 32 of the yoke assembly.

The springs are selected so as to hold the print head housing 26 in the orientation shown in FIGS. 1, 2 and 3. Any attempt to tilt the head 26 in either direction denoted by the double-headed arrow 60 in FIG. 3 will be resisted by the spring and the restoring force stored in the spring will tend to return the housing 26 to the orientation shown in FIGS. 1 to 3 as soon as any force tending to tilt the housing 26 relative to the yoke assembly is removed. Such a tilting force is, of course, exerted on the printing head assembly 26 in the event that an envelope or package is located below the print face 48 which is not of uniform thickness so that part of the print face is prevented from travelling in a downward direction by the same amount as another part of the print face.

The interaction of the two arms 30 and 32 with the rod 18 serves to centralise the yoke assembly and therefore the housing 26. However, once the cam 20 has rotated so as to depress the yoke assembly in the direction of the arrow 46, the interaction between the arms 30 and 32 ceases and the yoke assembly becomes freely floating by virtue of the fact that the point of contact between the cam 20 and the yoke plate, the point of attachment 42 of the spring 40 with the yoke plate and the rear mounting pin 36 are all on a straight line which is substantially perpendicular to the axis of pivoting of the head 26 relative to the yoke assembly and established by the stubshafts of which one is denoted by reference numeral 28.

As a consequence the head 26 can, relative to the baseplate 10 and therefore the platen 50, tilt not only in the direction of the double-headed arrow 60 but also from side to side as indicated by the curved arrows 62 and 64 in FIG. 1. The printing head can therefore accommodate gross unevenness in a packet or envelope located therebelow.

The printing head itself includes four endless belts of which one is shown at 66 in FIG. 5, arranged in parallel-spaced arrangement within the head. Each follows a generally oval path and at its lower end passes around an inking reservoir and transfer pad not shown in detail but designated by reference numeral 68. To this end the material from which the endless loop 66 is formed is preferably porous at least to certain printing inks and forms a so-called retentive pad porous rubber printing medium. The belt or loop 66 is formed around its external surface with a series of upstanding segments such as 70 and 72 each of which can if desired carry a character in relief which when the material forming the belt or loop 66 is saturated with ink will form an impression of the character on a sheet of paper or the like located below the printing head in the position designated in dotted outline at 74. To this end, an opening is provided in the underside of the housing through which the lowermost of the segments 70, 72 etc. can just protrude and in the illustration this is denoted by reference numeral 76.

At its upper end the belt passes around a driving pulley 78 which is either mounted directly onto one of the two head driveshafts 80 or 82 or is connected thereto through the intermediary of a uni-directional clutch (to be described). In FIG. 5 the driving wheel 78 can be thought of as comprising the shaft 80 or mounted thereon.

Drive for the shaft 82 is provided by a first electric motor 84 the output shaft of which includes a toothed pinion 86 which meshes with a gearwheel 88 which in turn drives a second toothed pinion 90 for driving a larger diameter gearwheel 92 splined or otherwise secured to the shaft 82.

For clarity, the second motor and gear train for driving the other aligned but separate shaft 80 are not shown in FIGS. 1 and 2. However, it is to be understood that the second motor is mounted back-to-back and may be in axial alignment with a first motor and a second gear train similar to that transmitting drive between the first motor and the shaft 82 is provided between the second motor (not shown) output shaft and the shaft 80.

Each of the two shafts 80 and 82 extends into the housing 26 by a sufficient amount to almost touch the opposite end of the other shaft. However, the two shafts are entirely separate from a rotational point of view.

Within the housing 26, two of the four endless belts such as 70 are driven by one of the shafts 80 and another two are driven by the shaft 82.

As will hereinafter be described, one of the endless belts in each pair is driven through a uni-directional clutch so that rotation of the shaft, for example, 80, in one direction will rotate both of the endless belts associated therewith but in the other direction will only drive the endless belt which is directly connected to the shaft or to a driving wheel itself non-rotatably secured on the shaft. Consequently, the two endless belts can be independently set so as to present selected characters such as 76 for printing by first of all rotating both of the endless belts in one direction until the first character associated with the clutched belt is in position and thereafter rotating the shaft in the opposite sense until the other character associated with the fixed wheel or belt has been moved into position.

The other pair of endless belts can be set in a similar manner by rotation of the other motor, first in one direction and then the other.

Although not shown, it is to be understood that a separate uni-directional clutch may be provided for each drive to each of the belts so that both belts are completely independent and rotation of the shaft such as 80 in one direction will only cause one of the belts to be rotated whilst rotation in the other direction will cause the other belt to be rotated.

It is, of course, not easy to see which particular character has been displayed in the window on the underside of the printing head for any particular belt and to this end a toothed indexing wheel is associated with each individual belt. One such wheel is shown at 94 in FIG. 5. The spacing between the teeth around the indexing wheel 94 is commensurate with the spacing between the upstanding segments such as 70, 72 around the endless belt 66 so that as the belt rotates so the indexing wheel must rotate by a corresponding number of segments. The indexing wheel 94 includes one or more electrical contacts (not shown) which, as the wheel 94 is indexed, make different combinations of connection between a plurality of conductors designated by reference numerals 96 and 98 by way of example only, carried by a conductor card 100 sandwiched between the index wheel 94 and the next index wheel along. These cards are more clearly shown in FIG. 1 and it will be noted that flying leads such as 102 are connected to the conductors such as 96, 98 etc. for conveying the pattern of electrical connections to a microprocessor or the like to establish the precise positions of the four index wheels 94. By appropriately coding the electrical connections, so an electrical signal can be derived indicative of the angular position of each of the four wheels 94 which therefore corresponds to the rotational position of the associated four endless belts 66 and therefore the four characters or groups of characters contained by the belts in the window in the underside of the printing head 26.

The window and surrounding framework constitutes a print face 48 of FIG. 3.

In FIGS. 2, 3 and 6 the bundle of conductors to the conductor cards 100 are only shown leading to one of the cards. In practice, a single bundle would in fact be led to and make connection with each of the cards as is shown in FIG. 1.

Reverting to FIG. 1, a microswitch 104 is shown mounted close to the second cam 22 mounted on the shaft 18 with the microswitch actuating lever 106 acting as a cam follower. The cam is shaped and fitted to the shaft 18 so that the microswitch is operated once every revolution of the shaft 18 and is opened (or closed) as required at a position in which the lobe of the cam 20 is furthest from the plate of the yoke assembly 34.

The design of print head assembly shown in FIGS. 1 to 7 is eminently suitable for incorporation into a franking machine in which a plurality of such head assemblies are located side by side. Each different head assembly can then be dedicated to one particular task associated with the franking of mail and appropiate characters and printing devices are located in each such dedicated printing head assembly.

Figure 8:
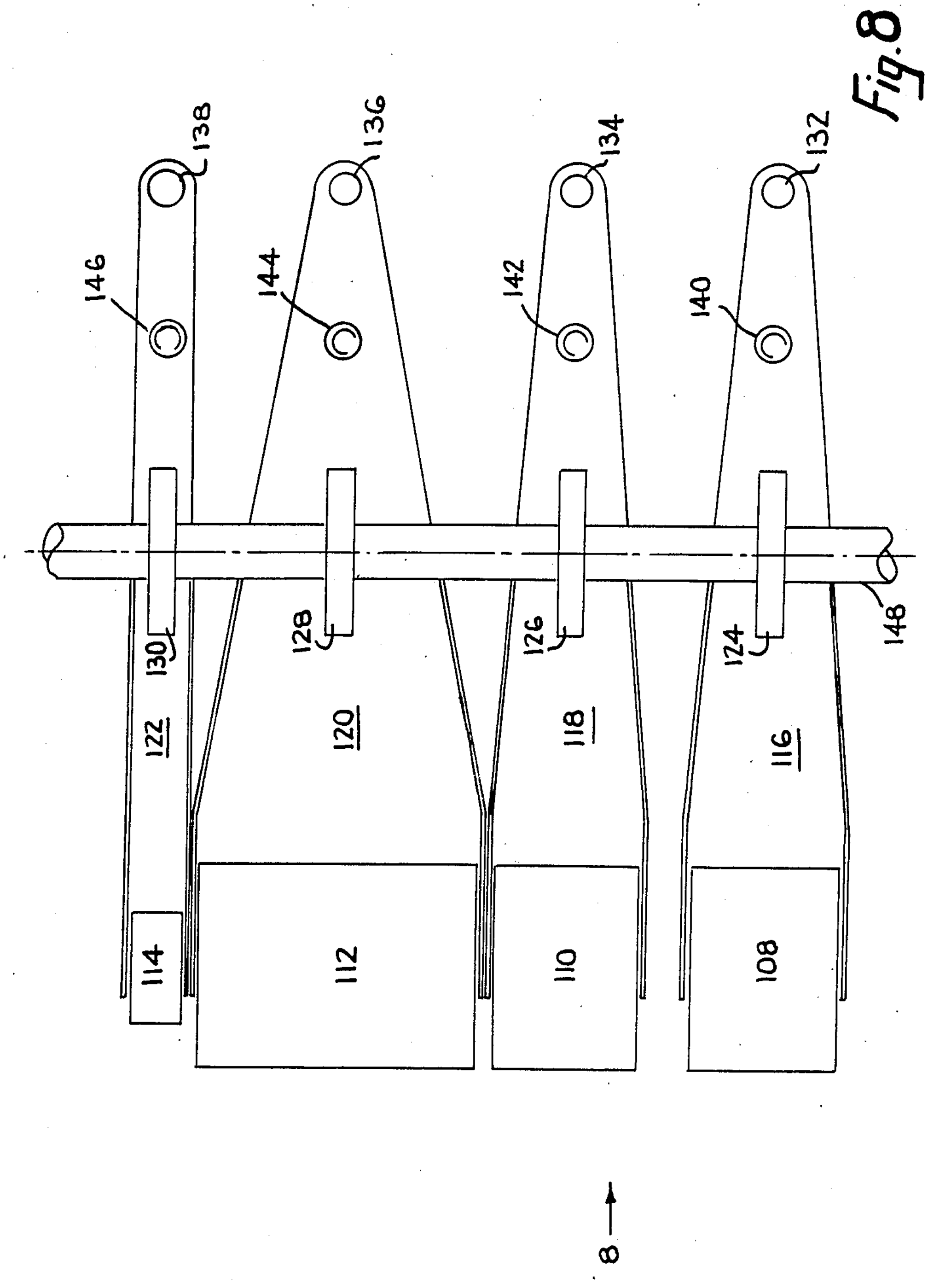
FIG. 8 is a top plan view, partly diagrammatic in format, of a complete printing head assembly for a franking machine incorporating printing head mechanisms such as shown in FIGS. 1 to 7.

Arrangements such as this is shown in FIG. 8 where four such printing heads are mounted at the end of four freely floating yoke or arm assemblies. The four printing heads are designated 108, 110, 112 and 114 and their respective support arms by the reference numerals 116, 118, 120 and 122.

Actuating cams, each corresponding to the cam 20 of FIG. 1, are denoted by reference numerals 124, 126, 128 and 130 respectively.

The lost motion free pivot points corresponding to the rear pin 36, 38 of FIG. 3 are denoted by reference numerals 132, 134, 136 and 138 respectively.

Springs corresponding to the spring 40 of FIG. 3 are shown at 140, 142, 144 and 146.

The cams 124 to 130 are all mounted on a common shaft 148 and drive therefor is derived therefrom a motor and gearbox assembly (not shown) similar to the item 16 of FIG. 1.

Figure 9:
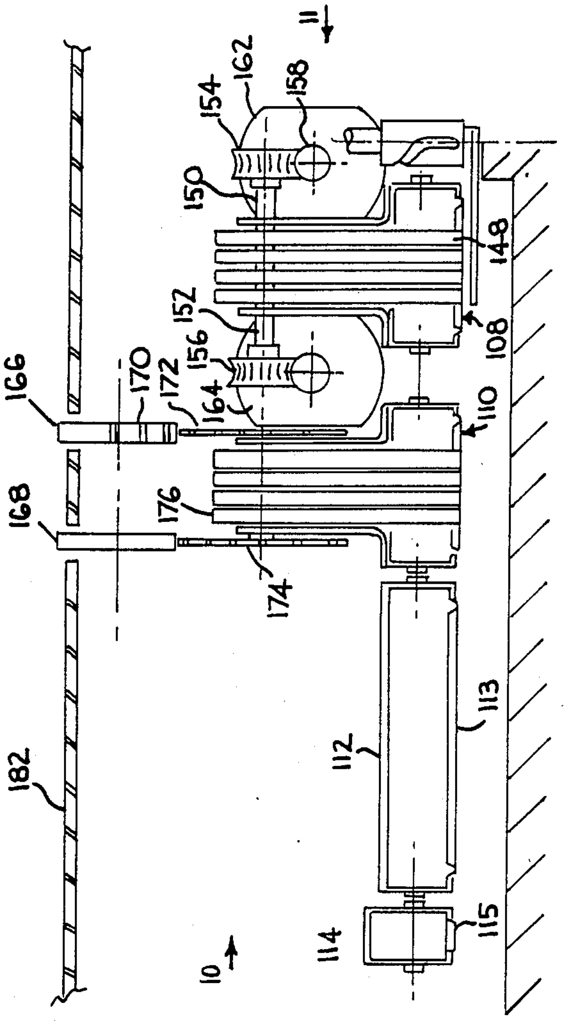
FIG. 9 is a front elevation of the apparatus shown in plan in FIG. 8 with protective covers removed to illustrate the interior of the printing heads.

FIG. 9 illustrates the assembly of FIG. 8 from the front as an elevation thereof in the direction of arrow 8. Print head 114 and 112 are each an ink-loaded porous rubber stamp having a printface 115 and 113 respectively containing characters or indicia which when urged into contact with a sheet of paper such as the outside of an envelope or packet will produce a pattern of information thereon.

The print heads 110 and 108 respectively are constructed basically in the same way as the head shown in FIGS. 1 to 7 in that they comprise a series of endless belts (see FIG. 11) of which one is designated 148 which have outwardly protruding segments containing characters for printing. Each of the belts can be indexed by appropriate rotation of one or the other of two drive shafts 150 and 152 which are themselves driven by toothed wheels 154 and 156 respectively themselves driven by worm gears 158 and 160 respectively on the outward shafts of two motors 162 and 164.

The print head 110, however, is not motor-driven but is manually rotatable to adjust the print head characters and to this end two thumbwheels 166 and 168 are provided which have external serrations such as at 170 which engage appropriately toothed wheels 172 and 174 respectively. The toothed wheels just referred to serve to drive one or other of two short axles (not shown) to rotate one or other of the endless belts such as 176 and the endless belts are engaged by externally segmented indicator wheels of which one is designated at 178 each having external protrusions for engaging in the segments around the endless belt 176 so as to rotate therewith.

By providing one indicator wheel for each of the endless belts 176 etc., so the characters lined up in the printing station by adjustment of the four endless belts 176 etc. can be displayed on the appropriate indicator wheels behind a window 180 provided in a front inclined wall of a housing 182 which covers the whole assembly.

Figure 10:
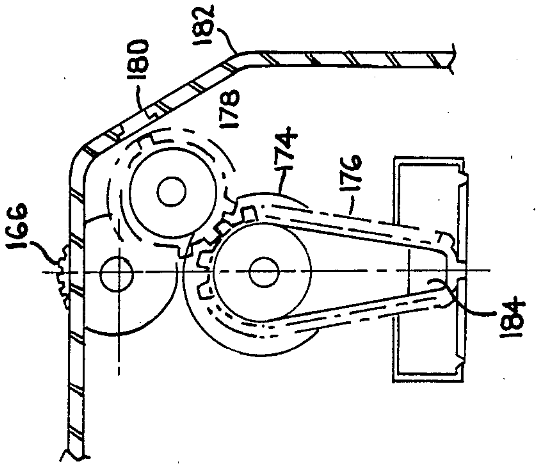
FIG. 10 is a view in the direction of arrow 10 in FIG. 9 with some of the elements removed for clarity to illustrate the indexing and printing mechanism within one of the printing head mechanisms of FIG. 9.

The franking machine thus incorporates three different types of printing head within the overall assembly, two in which the printing plates are self-inked for life and two in which the endless belts are of a porous material and are replenished by ink from a reservoir such as at 184 (see FIG. 10).

Figure 11:
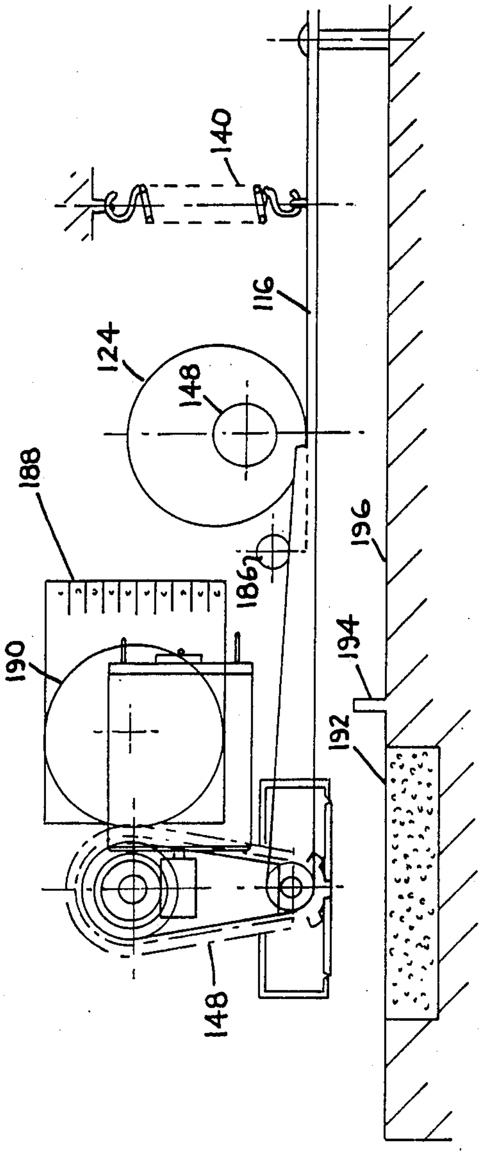
FIG. 11 is a side view of the apparatus shown in FIG. 9 viewed in the direction of arrow 11 in FIG. 9 illustrating relative layout of component parts.

FIG. 11 shows the layout of the various parts making up the overall assembly at least insofar as the print head 108 is concerned. To this end there is a yoke 116 and spring 140, operating cam 124 on shaft 148 and a stop shaft 186 (not shown in FIG. 8) extends across and prevents upward movement of the yoke assembly 116 beyond a certain amount under the action of the spring 140.

The encoder assembly 188 corresponds to the encoder cards 100 of FIGS. 1 to 7 embodiment and shown diagrammatically at 190 is one of the toothed wheels containing the electrical conductors which set up the contacts and circuits on the encoder boards and which rotates with rotation of the endless belt 148.

Below the printing stage is shown a soft resiliently deformable pad 192 to absorb unevenness and thick contents of envelopes and packets. A stop 194 running along the length of the base 196 behind the platen area 192 serves as a guide as to where the envelope, packet or the like should be pushed before the printing head is lowered.

Figure 13:
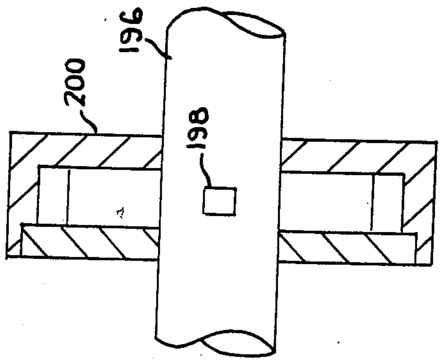
FIG. 13 is a cross-section of the drive wheel ratchet arrangement of FIG. 12.
Figure 12:
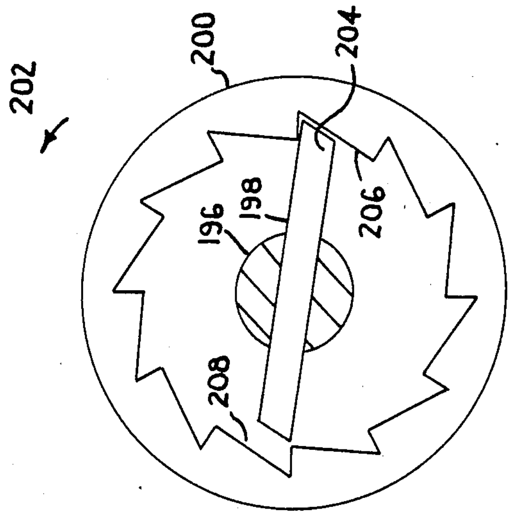
FIG. 12 illustrates the interior of a drive wheel ratchet having a uni-directional characteristic.

FIGS. 12 and 13 illustrate a uni-directional clutch arrangement in which a shaft 196 has secured therein a diametrically extending dog 198 for engaging the inside of an annulus 200 which is formed as a circular internal ratchet. The dog 198 is slidable axially within the shaft 196 As the shaft 196 rotates in the direction of the arrow 202, drive is transmitted between the end 204 of the dog 198 and one of the teeth of the ratchet. Rotation of the shaft 196 in the opposite direction to arrow 202 causes the dog to ride up the inclined surface 206 and to enter the cutaway region 208 on the opposite side of the ratchet wheel so that there is no tendency for any rotational drive to occur between the shaft 196 and the internal ratchet wheel 200.

FIG. 14 shows more clearly than the views of FIGS. 1–7 the internal detail of the printing head 26. The shafts 80, 82 are formed with reduced axially parallel grooves at their inboard ends one of which is shown in the cross-sectioned half view of FIG. 14, at 210. Rolling elements such as 212 are located in the grooves and support an annular member such as at 214 forming part of one of the driving wheels 78. The design of the grooves and rolling elements and shape of the interior of the annular member 214 is such that rotation of the shaft in one direction transmits drive to the driving wheel 78' whilst in the other direction, to the driving wheel 78". Endless bands containing printing characters are fitted arround the driving wheels 78 as previously described.

An electrical position-indicating signal is obtained from the rotation of the indexing wheel 94 co-operating with the driving wheel 78', 78" etc. In the view shown in FIG. 14 indexing wheel 94' co-operates with driving wheel 78'. On the lefthand side in FIG. 14 the indexing wheels etc. are shown in cross-section and the sliding electrical contact between the wheel and the conductive tracks on its associated card 100'. However, in the non-section half of FIG. 14 there can clearly be seen at 216 and 218. The indexing wheels 94', 94" etc. are freely rotatable above their central supporting axle 220 whilst the cards are non-rotatable relative thereto. An embodiment in which one of the driving wheels 78 or 78' is directly connected to each shaft is shown in FIG. 16.

FIG. 15 demonstrates how, after removing the coverplate 52 (shown in FIG. 7) the underside of the printing head 26 can be clearly seen to permit the semi-permanent printing matter to be changed if required. This is shown as the rectangular cross-hatched region 222 defining the aperture 224 through which the variable printing characters protrude. The region 222 is held in place by six screws 226 and is replaceable by other surrounds as required by removing the screws 226.

We claim:

1. A printing drive mechanism for printing character selection by which rotation of a drive means in one direction rotates a first member carrying printing characters but does not rotate a second member carrying printing characters, and rotation of the drive means in the opposite direction rotates the second member, at least the second member being driven by the drive means through a one-way clutch.

2. A printer drive mechanism for printing character selection by which a first member carrying printing characters is rotated by a direct connection between said first member and a driving means, and a second member carrying printing characters is rotatable by the driving means through a clutch which allows the second member to free wheel when the driving means is rotating in one direction but exerts a positive drive on the second member when the driving means rotates in the opposite direction.

3. A drive mechanism as claimed in claim 2 wherein the two members are directly mounted on a common shaft.

4. A mechanism according to claim 2, wherein the members comprise print wheels.

5. A mechanism according to claim 2, further comprising an indexing device for causing indexed movement of the members in registration with each other.

6. A postal franking machine incorporating a drive mechanism in accordance with claim 2.

7. A printer drive mechanism for printing character selection by which frist and second members, each carrying printing characters, which are drivable from a drive means for rotation about a common axis are drivable independently by a single motor, wherein the two members are connected to the motor through two one-way clutches acting in opposite hands so that rotation of the motor in one sense will cause only one of the members to rotate and rotation of the motor in the opposite sense will cause only the other member to rotate.

8. A drive mechanism according to claim 7, wherein the two members are mounted on a shaft through the intermediary of at least one one-way clutch.

9. A mechanism according to claim 7, wherein the members comprise print wheels.

10. A mechanism according to claim 7, further comprising an indexing device for causing indexed movement of the members in registration with each other.

11. A postal franking machine incorporating a drive mechanism in accordance with claim 7.

* * * * *